(12) United States Patent
Bychkov et al.

(10) Patent No.: US 7,698,480 B2
(45) Date of Patent: Apr. 13, 2010

(54) PORTABLE STORAGE DEVICE WITH UPDATABLE ACCESS PERMISSION

(75) Inventors: Eyal Bychkov, Hod Hasharon (IL); Yehuda Hahn, Ofra (IL); Mordechai Teicher, Hod Hasharon (IL); Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 60 days.

(21) Appl. No.: 11/773,971

(22) Filed: Jul. 6, 2007

(65) Prior Publication Data

US 2008/0059743 A1 Mar. 6, 2008

Related U.S. Application Data

(60) Provisional application No. 60/806,628, filed on Jul. 6, 2006.

(51) Int. Cl.
*G06F 13/10* (2006.01)
*G06F 12/16* (2006.01)

(52) U.S. Cl. .......................... 710/36; 711/163
(58) Field of Classification Search ................. None
See application file for complete search history.

(56) References Cited

U.S. PATENT DOCUMENTS

| 2002/0183985 | A1* | 12/2002 | Hori et al. ................ 703/1 |
| 2003/0135748 | A1* | 7/2003 | Yamada et al. ............ 713/193 |
| 2005/0210236 | A1* | 9/2005 | Lee et al. ................ 713/153 |
| 2005/0216739 | A1* | 9/2005 | Lee et al. ................ 713/168 |
| 2007/0056042 | A1* | 3/2007 | Qawami et al. ............ 726/26 |

OTHER PUBLICATIONS

IEEE P1667™/D8, Draft Standard Protocol for Authentication in Host Attachments of Transient Storage Devices, IEEE Standards Activities Department, Jul. 13, 2006, 59 pages.
Media Transfer Protocol Enhanced Revision 0.96, Microsoft Corporation, Aug. 31, 2006, 258 pages.
R. Fielding et al, Hypertext Transfer Protocol—HTTP/1.1, Network Working Group, Jun. 1999, 157 pages.
A. Feier et al., The SSL Protocol Version 3.0, Transport Layer Security Working Group, Nov. 18, 1996, 59 pages.

* cited by examiner

*Primary Examiner*—Ilwoo Park
(74) *Attorney, Agent, or Firm*—Brinks Hofer Gilson & Lione

(57) ABSTRACT

A portable storage device controllable by a remote service center is disclosed herein. In some embodiments, the portable storage device includes a register for storing permission indicia and a non-volatile user memory for storing user data. Upon receiving a permission directive from a remote service center (e.g. via the host device), the permission indicia may be replenished (i.e. if it is desired to extend additional device-use privileges) or depleted (i.e. if it is desired to deny or reduce device-use privileges). When providing host access to the onboard non-volatile user memory of the portable storage device, the permission indicia are consumed, thereby limiting the extent of host-user memory access allowable without a refresh of the permission indicia. Exemplary permission indicia include but are not limited to distinct host-device couplings, inter-device transfer quota, and usage time quote. Methods, systems including the aforementioned portable storage device, and computer code are also described.

15 Claims, 3 Drawing Sheets

# PORTABLE STORAGE DEVICE WITH UPDATABLE ACCESS PERMISSION

CROSS REFERENCE TO RELATED APPLICATION

This application claims the benefit of U.S. provisional patent application 60/806,628 filed on 6 Jul. 2006 by the present inventors.

BACKGROUND OF THE INVENTION

1. Field of the Invention

The present invention relates to portable storage devices, for example, portable storage devices carrying proprietary data of an institution.

2. Description of Related Art

Portable storage devices are commonplace, in form factors such as USB flash drive (UFD); PC-cards; and small storage cards used with digital cameras, music players, handheld and palmtop computers, and cellular telephones. Portable removable storage devices also include portable magnetic disks and portable digital appliances (music players and cellular telephones) that double as general-purpose storage devices.

Institutions such as corporations, government agencies and other organizations have found removable storage devices very useful for allowing employees to carry proprietary data for working at home or when traveling. However, proprietary data is often confidential, and unauthorized access to proprietary data may be considered damaging to the institution. Two commonly identified risks are the loss or theft of a portable storage device carrying proprietary data, and theft of proprietary data by unauthorized insiders. There are a variety of known solutions for password or biometric protection of the access to the content of a portable storage device, and technical and administrative measures for restricting and monitoring data copying from the institution network computers to portable storage devices.

Another potential risk is that of "insider" employees who at first "legitimately" take possession of the storage device on which proprietary data is stored, and then have their status changed from "authorized" to "unauthorized" for carrying proprietary information. Examples include employees that are dismissed, or employees that fall under suspicion. In such cases, an employee may already carry in his or her portable storage device sensitive proprietary information that he or she is no longer authorized to access.

There is thus a need to allow institutions to restrict access to proprietary information stored in a portable storage device even from users who legitimately carry such devices.

BRIEF SUMMARY OF THE INVENTION

The present inventors are now disclosing a portable storage device controllable by a remote service center, for example, via a host to which the portable storage device is coupled. The portable storage device includes an onboard non-volatile user memory for storing user data and an onboard non-volatile register for storing permission indicia. Host-access to the non-volatile user memory is regulated in accordance with the permission indicia by a controller of the non-volatile device and/or by code (for example, device driver code) executing on the host device.

These permission indicia are: (i) consumed in accordance with an extent of host access to the non-volatile user memory; and (ii) may be replenished or depleted when a permission directive is received from the remote service center.

In one exemplary non-limiting use scenario, an institution wishes to restrict access to proprietary information stored on a portable storage device that it distributes to its employees. According to this scenario, the institution wishes to provide "full" access to the non-volatile user memory or some portion thereof to employees in "good standing," while providing only restricted or limited access to employees on "probation," for example, employees who are candidates for being terminated from the institution. Thus, when the user couples the device to a host device that is "online" and capable of communicating with the remote service center, a 'refresh permission' directive is received from the remote service center only if the owner of the portable storage device is an employee in "good standing."

Otherwise, if the employee is on probation, only limited use and/or a limited "quota" of device usage is permitted. In different non-limiting examples, employees "on probation" (i) may be only allowed to use the portable storage device for a certain amount of time until a renewed permission from the institution-controlled remote service center is required, and/or (ii) may be allowed to read a certain amount of data from the user memory or only allowed to write a certain allowed a certain amount of data to the user memory until renewed remote permission is required and/or (iii) there may a "counter" which counts the number of distinct times the portable storage device to the host (i.e. a 'quota' of distinct host-device couplings), and only a certain number of distinct host-device couplings are allowed before a remote permission is required for additional host-access to the non-volatile user memory or a portion thereof.

This may be enforced by having the device controller and/or code executing on the host device "consume" the permission indicia in accordance with an extent of device usage. As the permission indicia are 'consumed' the non-volatile register may be updated accordingly.

In another related scenario, when an employee who was previously "on probation" is terminated from the institution, a directive to deplete the permission indicia may be received at the host and/or portable storage device from the remote service center. In this scenario, the "on probation" employee possessor of the portable storage device may not be allowed to utilize all access rights of the "on probation" employee. Instead, these access rights may be "prematurely" terminated by a "deplete permission indicia" directive received from the service center.

Although the previous example related to the specific cases of binary or "all-or-nothing" enforcement of certain types of access rights, this is not a limitation. In another non-limiting example, the access to the non-volatile user memory may be degraded as permission indicia are consumed—for example, the speed of memory access is reduced as the level of remaining permission indicia drops.

It is now disclosed for the first time a portable storage device controllable by a remote service center, the storage device comprising: a) a device interface for operatively coupling with a host; b) a non-volatile user memory for storing user data; c) a non-volatile register for storing permission indicia; and d) a controller operative to A) regulate access, in accordance with the permission indicia, by the host to the non-volatile user memory: B) consume the permission indicia in accordance with an extent of the host access; and C) replenish or deplete the permission indicia in accordance with a permission directive received from the remote service center via the host device.

In different embodiments, the aforementioned "access regulation" (i.e. carried out by the controller and/or code executing on the host device) may by carried out by effecting one or more presently-disclosed regulation operations.

A first disclosed regulation operation relates to the onboard non-volatile "user memory"—i.e. the "visible" portion of non-volatile memory in which proprietary data and/or user data (for example, files and folders) reside. According to this "first" regulation operation, host access to the entirety of the non-volatile user memory may be allowed or disallowed (i.e. by any combination of the controller and/or code executing on the host device). This "first" regulation operation differs from the case where certain folders or file or "objects" stored in the user memory are selectively locked or unlocked—according to the "first" regulation operation, this entire "user memory" is rendered accessible or inaccessible according to the permission indicia.

A second regulation operation relates to "directory services"—i.e. whether or not a given item (i.e. folder or file) is visible in a directory listing. According to this second regulation operation, the ability to view contents of a user file or to execute a user file regulated is not the only regulated user privilege. According to the "second" regulation operation, whether or not a given file or folder appears in a directory listing is also regulated. Thus, in this example, a given file or folder for which access is disallowed would not appear in any directory listing accessible from the host device.

A third regulation operation relates to 'write privileges'—i.e. the ability to write data from the host device to the non-volatile user memory of the portable storage device.

According to some embodiments, the permission indicia include distinct host-device coupling quota data.

According to some embodiments, the permission indicia include inter-device transfer quota data.

According to some embodiments, the permission indicia include time quota data.

According to some embodiments, the non-volatile user memory and the non-volatile register reside in a single non-volatile storage module—for example, a single non-volatile storage module partitioned into two regions.

Alternatively, the non-volatile user memory and the non-volatile register reside in separate non-volatile storage modules.

According to some embodiments, the controller and/or code executing on the host is further operative to: D) disallow host read access to the permission indicia without authorization from the remote service center. Thus, in these embodiments, the ability to determine, from the host device, an indication of the permission indicia (i.e. "remaining rights") is regulated (i.e. allowed or disallowed). This could be useful for a situation, for example, where it is desired not to let an employee know that he or she is under suspicion, and thus there is a desire to not reveal to this user the remaining usage rights associated with the permission indicia.

It is now disclosed for the first time a portable storage device controllable by a remote service center, the storage device comprising: a) a device interface for operatively coupling with a host; b) a non-volatile including: i) a non-volatile user memory for storing data; ii) a non-volatile register for storing permission indicia; c) a device controller; and d) driver code stored in the non-volatile memory, wherein, upon execution of the driver code, a combination of the executing driver code and the device controller (i.e. any combination—i.e. the executing driver code alone, the device controller alone, or any combination thereof) is operative to: A) regulate access by the host to the non-volatile user memory by effecting at least one regulation operation selected from the group consisting of, i) in accordance with the permission indicia, allowing or disallowing host access to an entirety of the non-volatile user memory; ii) in accordance with the permission indicia, allowing or disallowing host access to directory services for the non-volatile user memory; iii) in accordance with the permission indicia, allowing or disallowing the host device to write data to the non-volatile user memory; B) consume the permission indicia in accordance with an extent of the host access; and C) replenish or deplete the permission indicia in accordance with a permission directive received from the remote service center via the host device.

It is now disclosed for the first time a method of handling regulation of host access to the non-volatile user memory in a system including a host device coupled to a portable storage device having a non-volatile user memory and a non-volatile register for storing permission indicia. The method comprises the steps of: a) in accordance with the permission indicia stored in the non-volatile register, regulating access to the non-volatile memory of the non-volatile storage device by effecting at least one regulation operation selected from the group consisting of: i) in accordance with the permission indicia, allowing or disallowing host access to an entirety of the non-volatile user memory; ii) in accordance with the permission indicia, allowing or disallowing host access to directory services for the non-volatile user memory; and iii) in accordance with the permission indicia, allowing or disallowing the host device to write data to the non-volatile user memory; b) consuming the permission indicia in accordance with an extent of the host access; and c) when the host device is in communication with a remote service center, replenishing or depleting the permission indicia in accordance with a permission directive received from the remote service center via the host device.

It is now disclosed for the first time a storage system comprising; a) a portable storage device including: i) a non-volatile user memory for storing user data; and ii) a non-volatile register for storing permission indicia; and b) a host device coupled to the portable storage device, wherein a combination of the host device and the portable storage device (i.e. any combination—i.e. either the host device or portable storage device alone, or each device effecting some operations and working on combination with the other) is operative to: i) in accordance with the permission indicia stored in the non-volatile register, regulate access to the non-volatile memory of the non-volatile storage device by effecting at least one regulation operation selected from the group consisting of: A) in accordance with the permission indicia, allow or disallow host access to an entirety of the non-volatile user memory; B) in accordance with the permission indicia, allow or disallow host access to directory services for the non-volatile user memory; and C) in accordance with the permission indicia, allow or disallow the host device to write data to the non-volatile user memory; ii) consume the permission indicia in accordance with an extent of the host access; and iii) when the host device is in communication with a remote service center, replenish or deplete the permission indicia in accordance with a permission directive received from the remote service center via the host device.

BRIEF DESCRIPTION OF THE DRAWINGS

The present invention will be understood and appreciated more fully from the following detailed description, taken in conjunction with the drawings in which.

Figure 1:
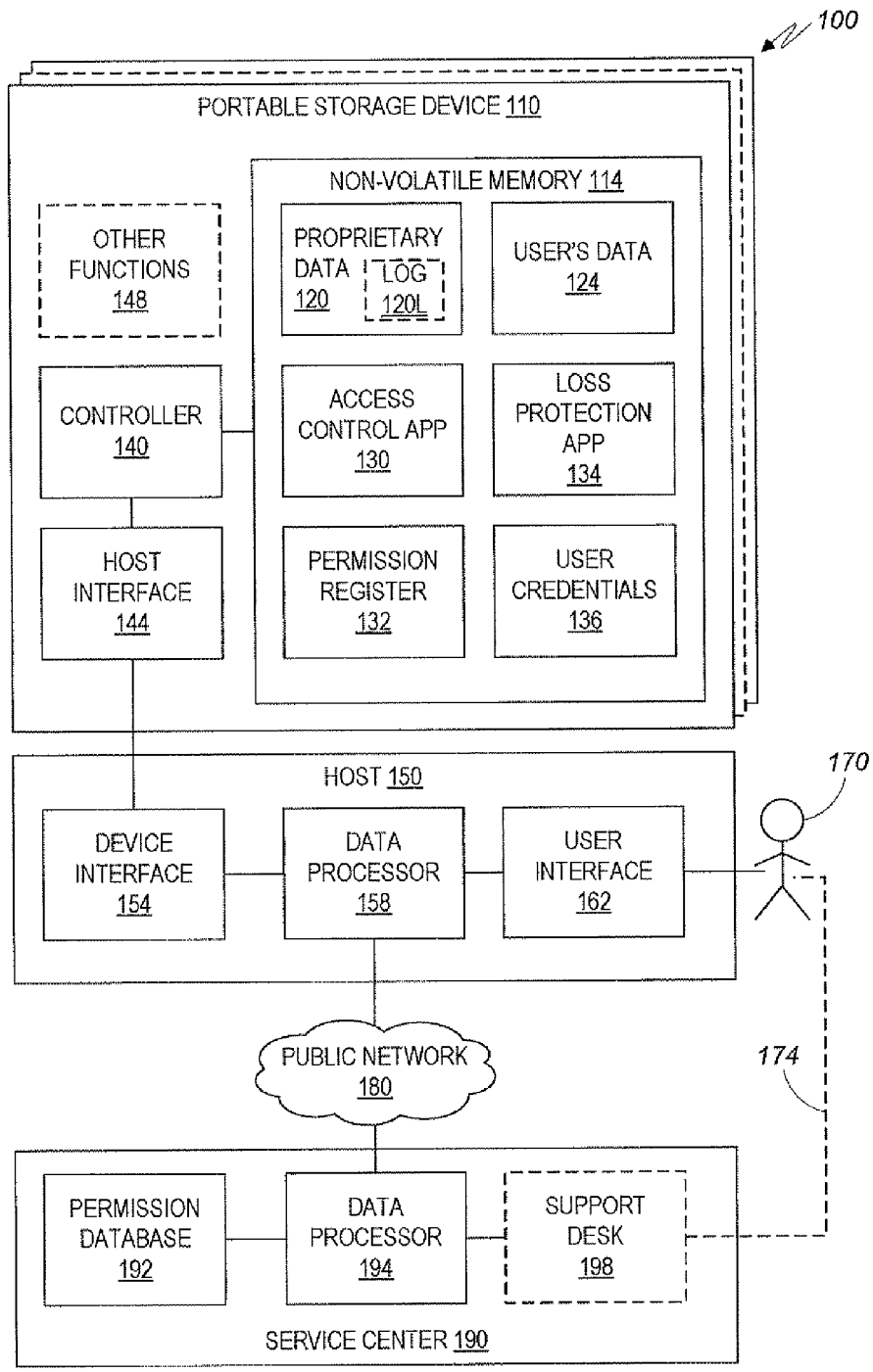
FIG. 1 provides a block diagram of an exemplary system including a portable storage device, a host, and a remote service center.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to'), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed method, device and system for regulating host-access to an onboard non-volatile user memory of a portable storage device is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

For convenience, certain terms employed in the specification, examples, and appended claims are collected here.

For the present disclosure, a "institution" is an entity that owns propriety information. Non limiting examples are a company, organization or government agency.

For the present disclosure, a "service center" is a computer system that is operated by or for an institution and can be contacted via a communication network such as the Internet, mobile telephony or land telephony.

For the present disclosure, a "user" is a person authorized by an institution to carry and access proprietary information of the institution.

For the present disclosure, a "host" is a user-operated device that includes a processor that allows access to the content of a portable storage device and communication means for connecting to a service center. Non-limiting examples for a host are a desktop or laptop personal computer, a cellular telephone or a two-way pager.

For the present disclosure, a "portable storage device" is a storage device that stores proprietary information of an institution and is carried by a user for interfacing with selectable hosts in order to access the information stored in the portable storage device and/or to communicate with a service center of the respective institution that owns the proprietary information. Non-limiting examples for a portable storage device include a USB flash drive, a memory card, or a digital appliance (portable music player, cellular telephone) that doubles as a storage device accessible by an external host.

It will be noted that the definitions above are sensitive to specific roles of hosts and storage devices. In an example of a pair of a memory card and a cellular telephone that can both access the content of the memory card and contact a service center, the memory card can be seen as a portable storage device and the cellular telephone can be seen a host. But if part of a memory of a cellular telephone is allocated for storage functionality that is inaccessible to the telephone and is accessible to personal computers through a USB interface, then the entire cellular telephone can be considered a portable storage device and the personal computer becomes the host. Accordingly, portable music players that double as USB disks will be considered portable storage devices that interface with hosts that are personal computers.

FIG. 1 describes a system 100 constructed according to an embodiment of the present invention. The system 100 includes three primary parts: portable storage device 110, host 150 and service center 190. Host 150 and service center 190 communicate via a public network 180, such as the Internet or a cellular telephony network. The connection between portable storage device 110 and a selected host 150 is enabled by host interface 144 and device interface 154, respectively, which may use protocols such as USB (universal serial bus), card protocols or wireless protocols (for example, Bluetooth or infrared).

Portable storage device 110 includes a non-volatile memory 114 controlled by a programmed controller 140. Thus, any access to any data stored within non-volatile memory 114 is made under the control of controller 140, according to access rules programmed into controller 140, including access rules according to the present invention as depicted below. In some cases, portable storage device 110 also includes other functions 148, such as cellular telephony, picture taking, music playing, etc., that may include access to the memory portion user's data 124.

Proprietary data 120 is a portion of non-volatile memory 114 allocated for storing proprietary data of an institution that is protected according to the teachings of the present invention. Optionally, part of proprietary data 120 is log 120L, that records all data traffic into and from proprietary data 120, a recording made under the operating system of host 150 or by the programming of controller 140. User's data 124 is a portion of non-volatile memory 114 allocated for access by host 150 or other functions 148 out of the controls and restrictions of the present invention.

For the present disclosure, the proprietary data 120 and the user's data 124 reside in what is collectively referred to as the non-volatile "user memory" for storing "user data." This is the workspace of files and folders that may be visible in a directory or file listing. In one example, access to the entirety of the "user memory" for storing user data may be allowed or disallowed in accordance with the permission indicia rather than on a file-by-file basis or a folder-by-folder basis or on a file-type basis, etc.

Optionally, the portable storage device includes a loss protection application 134 for protecting data from unauthorized third parties who get a hold of the storage device 110.

In the current example, access control application 130 is software code to be run on controller 140 of portable storage device 110 and/or data processor 158 of host 150 in order to implement the teachings of the present invention as depicted below. For example, access control application 130 may be composed of two applications: a first application running on data processor 158 to manage access to proprietary data 120 only according to the current content of permission register 132, and a second application running on data processor 158 of host 150 to manage or enable communication with service center 190 via public network 180. In one example, access control application 130 checks the current access permissions from permission register 132, updates them through communication with a service center 190 and control the access from a host 150 to proprietary data 120 according to the current permissions. A detailed description of the functions and steps of access control application 130 will be brought below with respect to FIG. 4.

Host 150, such as a personal computer, cellular telephone or personal digital assistance that includes Internet or cellular connectivity, is a standard device providing user 170 with access, via user interface 162 (for example, screen and keyboard) to the data stored in portable storage device 110. Data processor 158 represents herein the processor, memory, operating system, drivers and application software common in general computing to the respective type of host 150.

Service center 190 is operated by or for the institution that owns the proprietary information stored in the memory portion allocated for proprietary data 120. It includes a data processor 194, that can be best visualized as an internet or cellular network server, which can be communicated by host 150 for updating permission register 132 of portable storage device 110. Permission database 192 includes that current permissions granted to each every portable storage device 110, and is updatable by an administrator of service center 190 (not shown); thus, for example, if a certain user turn to become untrusted, the respective record in permission database 192 will be updated by the system administrator of service center 190, which will affect an update of the permission register 132 of the respective portable storage device 110 upon the next communication between portable storage device 110 and service center 190 through any host 150.

In some embodiments of the present invention, it may be desirable to have a manual alternative for updating permission register 132 from permission database 192 if a public network 180 is not readily available. For example, when traveling a user may have access to a telephone but not to an Internet connection. For such a case, support desk 198 and manual connection 174 are added. Support desk 198 is either a manned workstation or an automated voice answering facility that can affect data transfer between permission database 192 and permission register 132 via manual connection 174, user 170, user interface 162, data processor 158, device interface 154, host interface 144 and controller 140. The manual process will be described in more below with respect to FIGS. 3 and 4.

Figure 2:
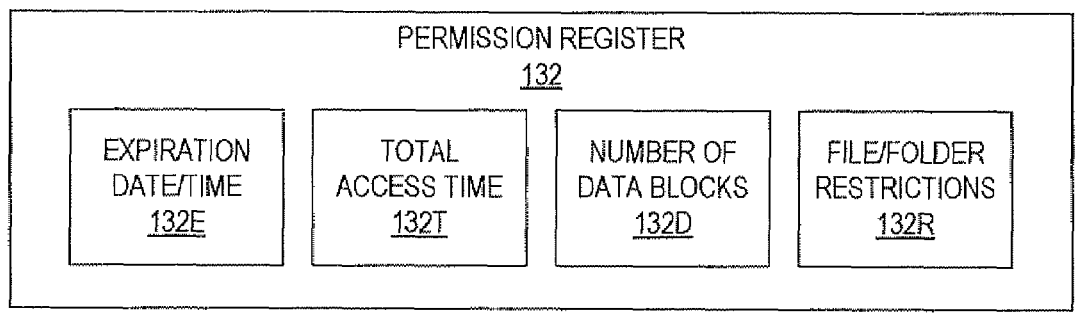
FIG. 2 provides a block diagram of an exemplary permission register.

FIG. 2 describes in more detail permission register 132 of FIG. 1 according to some embodiments. Permission register 132 instructs controller 140 running access control application 130 what data of proprietary data 120 can be made accessible to host 150. Exemplary restrictions included in permission register 132 include: expiration date/time 132E which defines that data is allowed until a specific date and time; total access time 132T that defines that the accumulated time that portable storage device 110 (i.e. the "time quote data") can be connected to a host 150 for allowing data exchange; number of data blocks 132D is a restriction on the number of data blocks that can be accessed; file/folder restrictions 132R identify specific files and/or folder that are presently allowed for or barred from access. It will be noted that such permissions preferably allow offline operation to the extent defined by the permission. Thus, a user who is allowed 3 hours access to portable storage device 110 or ten thousand data blocks of access to proprietary data 120 can consume that quota when operating online or offline, but will require an online communication session with service center 190 in order to refresh the quota or "replenish" the permission indicia.

The restriction by expiration date/time 132E may need special attention in the common situation where portable storage device 110 lacks a power supply of it own, hence lacks a trustworthy real-time clock. While a real-time clock of host 150 can be accessed by access control application 130 even in offline situations, such a clock can be easily readjusted by the user for showing a false time which falls within the allowed usage quota of expiration date/time 132E. In online situations an access to a trusted clock (not shown) through public network 180 can be mandated by access control application 130, but in online situations mandating access to service center 190 could offer better control. Thus, when portable storage device 110 lack a real-time clock of its own, expiration date/time 132E restriction is preferably accompanied by requiring other permission forms from FIG. 2, as well as a locking mechanism that locks portable storage device 110 (or at least access to proprietary data 120) once the expiration time has been reached and until it is extended by communicating with service center 190.

Figure 3:
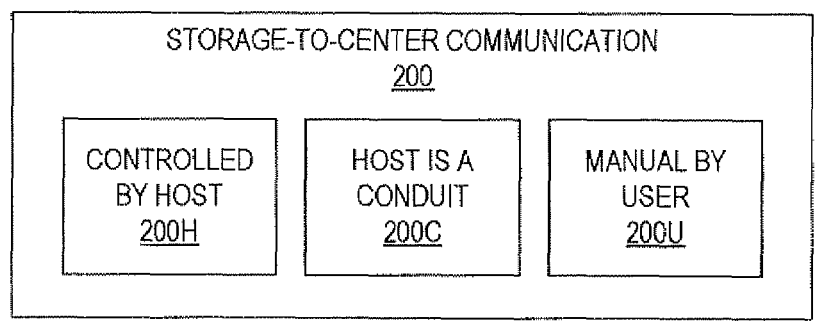
FIG. 3 provides a description of an exemplary storage-to-center communication.

FIG. 3 schematically describes three alternative technical solutions for connecting portable storage device 110 to remote service center 190. The first solution is controlled by host 200H, where host 150 mediates all communication between portable storage device 110 and service center 190. Thus, access control application 130 is loaded, partly to run controller 140 and partly to run data processor 158. On data processor 158 the application communicates with service center 190 via public network 180, to request permission renewal according to permission database 192. Identification of portable storage device 110, which preferably includes mutual authentication between portable storage device 110 and service center 190, is made through a series of messages between service center 190 and portable storage device 110, all mediated by host 150 as prescribed by access control application 130. Further to identifying portable storage device 110, service center 190 provides the respective permission from permission database 192 to host 150 which provides them to portable storage device 110 for updating permission register 132.

A second solution for connecting portable storage device 110 to service center 190 is based on host is a conduit 200C. Under this approach, portable storage device 110 has sufficient processing and communication power to act as a client of public network 180, and needs host 150 as a conduit to public network 180 on the one hand, and for its user interface 162 on the other hand. Thus, after establishing connection between portable storage device 110 and public network 180 with the aid of host 150, which may include user identification through user interface 162, controller 140 communicates with data processor 194 for identifying and authenticating portable storage device 110 to service center 190, followed by updating permission register 132 according to the respective record of permission database 192. A exemplary mechanism for doing this may be using a secure session between the service center 190 and the device 110.

Following is a non-limiting example of an exchange of credentials using this exemplary non-limiting mechanism:

Host interface 144 initiates a 1667 handshake with device 110 using the Probe commands as defined in IEEE 1667, Page 27.

Device 110 responds to host 144 with a Probe response that includes an Authentication Silo ID as defined in IEEE 1667, Page 30-31.

Host 144 initiates a connection via HTTP/SSL (as defined in RFC 2616 and the W3C SSL Standard version 3.0) to service center 180, and POSTs the response received from Device 110.

Service Center 180 authenticates the device 110 using the workflow described in Page 23 of the IEEE 1667 standard. Each command payload cited in Annex A of the standard is generated by Service Center 180 and passed to device 110 via host 144, and each response payload generated by device 110 is passed to Service Center 180 via host 144.

Following authentication, session keys are derived from the certificate presented by device 110 and the certificate presented by the Service Center 180. These keys are used to re-negotiate a SSL connection (as described in Section 5.3 of the SSL 3.0 protocol).

The SSL connection is now encrypted using a key-pair that is stored in hardware at device 110 and at the server side in Service Center 180. Data relating to policy is encrypted end-to-end and host 144 is not privy to the content of the messages.

A third solution for connecting portable storage device 110 to service center 190 for renewing permissions assumes that public network 180 is unavailable. For example, a traveling user has no Internet access by still need to access proprietary data 120 of his/her portable storage device 110. Presuming that the user has an alternative access method, e.g. a telephone, for communicating with support desk 198 of service center 190, the user relays messages between portable storage device 110 and service center 190. For example, the user reads from user interface 162 an identification/authentication numeric message of portable storage device 110 that is generated by controller 140 under access control application 130. The user keys-in the numeric message using his telephone keypad, which is received by support desk 198 and verified by data processor 194. On successful identification/authentication by service center 190, a voice message which represents a coded permission renewal is generated by data processor 194 according to the respective record of permission database 192, and this message is heard by user 170 via manual connection 174. The user keys-in the message into user interface 162, and data processor 158 sends the message to portable storage device 110 for updating the content of permission register 132. It will be noted that if support desk 198 is manned by a human operator, user 170 can talk to that operator via manual connection 174 instead of pushing telephone buttons and listening to a synthesized voice message.

Figure 4:
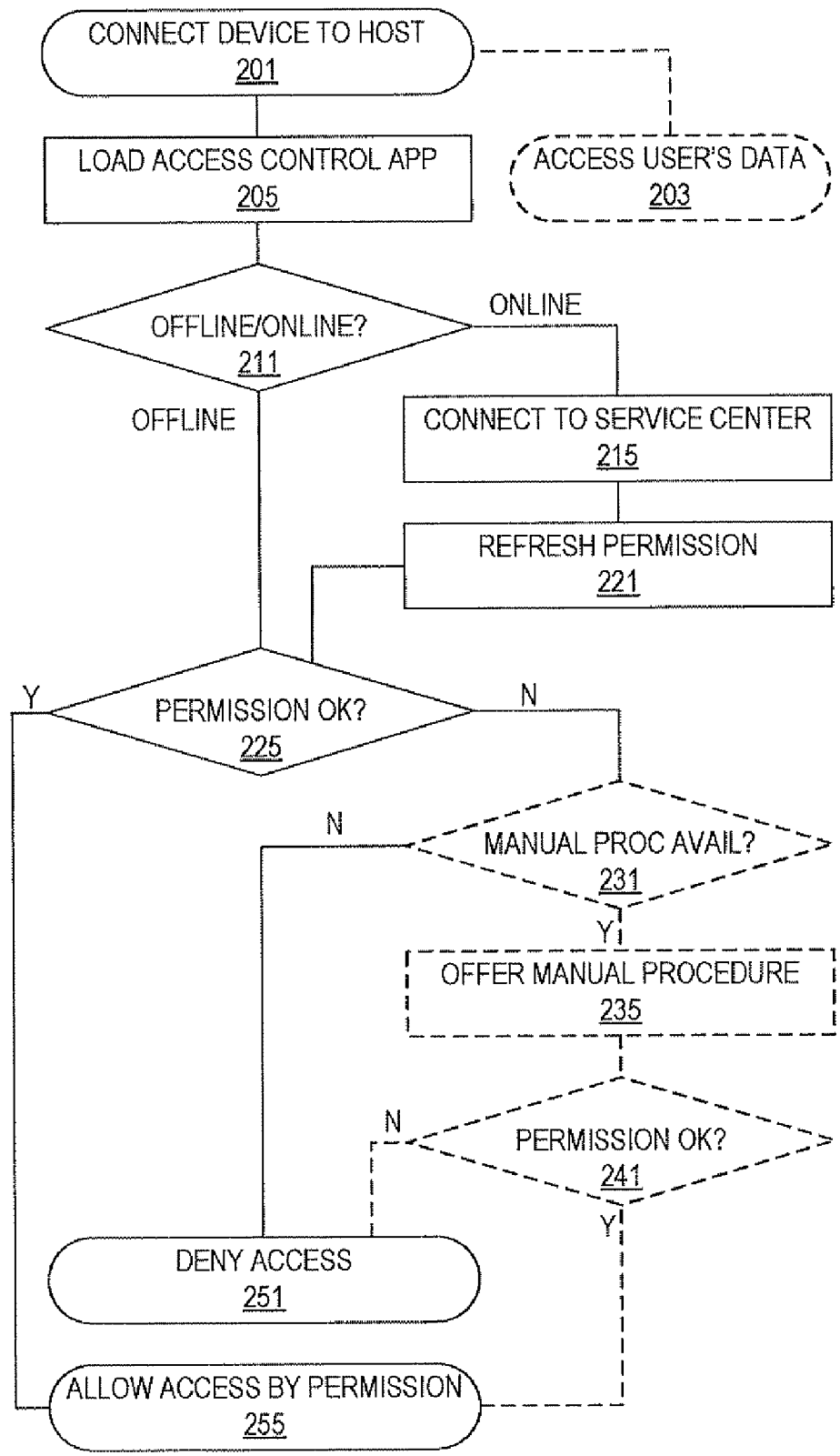
FIG. 4 provides a flow chart of an exemplary routine for handling regulation of permission to the non-volatile user memory.

FIG. 4 describes the operation of a preferred embodiment of the present invention, with reference also to FIGS. 1-3. As a first step 201, a portable storage device 110 is connected to a host 150. This is implemented, for example, by inserting a USB flash drive into a personal computer; by inserting a memory card into a cellular telephone; or by interfacing between a cellular telephone and a personal computer via a Bluetooth or infrared link. It will be noticed that in the above description a cellular telephone has been described a first time as a host of a memory card, and a second time as a memory device for a personal computer. Thus, the nature of a device is determined by its function in the context of the present invention, and not by other considerations. In an optional step 203, the user may use host 150 to access user's data 124 conventionally, out of the context and permission requirements of the present invention.

Steps step 205-255 below describe the cooperative operation of portable storage device 110 and host 150 under access control application 130 running on both controller 140 and data processor 158. In a step 205, access control application 130 is loaded into controller 140 and data processor 158. In a step 211 access control application 130 checks whether host 150 is online or offline, i.e. whether it can or cannot communicate with service center 190 via public network 180, respectively. In the online situation, in step 215 portable storage device 110 communicates with service center 190 under either of the arrangements 200H or 200C of FIG. 3, and in a step 221 permission register 132 is updated to "replenish" permission indicia according to the current content of the respective record in permission database 192.

Also optionally in step 221, log 120L is uploaded to service center 190 for monitoring. A step 225 that follows either step 221 or an offline result in step 211, the current access permission according to permission register 132 is checked by controller 140, to determine whether the user is permitted to access proprietary data 120; in the event of an "offline" situation, this check may involve comparing the current date/time retrieved from host 150 or from an Internet host with the expiration date/time 132E (FIG. 4). If the check result is positive, in a step 255 the user is allowed to access proprietary data 120 using the user interface 162 of host 150; the access is according to the current content of permission register 132 (see also FIG. 2), and can be restricted by total access time 132T, number of data blocks 132I), or to specific files/folders 132R. Step 255 also optionally involves update to log 120L according to the actual access made to proprietary data 120.

In the event that access permission is not granted in step 255, in either online or offline situation, a step 231 checks whether a manual permission procedure (involving user 170, manual connection 174 and support desk 198 of FIG. 1) is available. If no such procedure is available, then the process is terminated in a step 251 by denying access to proprietary data 120. If in step 231 a manual procedure is found available, then in a step 235 the user is offered to communicate with support desk 198 via manual connection 174, and if he/she receives a fresh permission by a permission code, such permission is entered by the user via user interface 162 into permission register permission register 132. In a step 241 the permission status is checked, which ends up with either access approval in step 255 or access denial in step 251.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A portable storage device controllable by a remote service center, the portable storage device comprising:

a) a device interface for operatively coupling with a host;
b) a non-volatile user memory for storing user data;
c) a non-volatile register for storing permission indicia; and
d) a controller operative to:
   A) regulate access by said host to said non-volatile user memory by allowing or disallowing host access to a directory for said non-volatile user memory in accordance with said permission indicia
   B) consume said permission indicia in accordance with an extent of said host access;
   C) replenish or eliminate said permission indicia in accordance with a permission directive received from the remote service center via said host device; and
   D) degrade access to said non-volatile user memory by reducing a speed of memory access as a level of remaining permission indicia decreases.

2. The portable storage device of claim 1 wherein said permission indicia include distinct host-device coupling quota data.

3. The portable storage device of claim 1 wherein said permission indicia include inter-device transfer quota data.

4. The portable storage device of claim 1 wherein said permission indicia include time quota data.

5. The portable storage device of claim 1 wherein said non-volatile user memory and said non-volatile register reside in a single non-volatile storage module.

6. The portable storage device of claim 1 wherein said non-volatile user memory and said non-volatile register reside in separate non-volatile storage modules.

7. The portable storage device of claim 1 wherein said controller is further operative to: E) disallow host read access to said permission indicia in absence of authorization from the remote service center.

8. The portable storage device of claim 1 further comprising driver code stored in said portable storage device, wherein a combination of executing said driver code and said device controller is operative to carry out said steps of A) through D).

9. The portable storage device of claim 8, wherein said driver code is stored in said non-volatile memory of said portable storage device.

10. A method of handling regulation of access by a host device to a non-volatile user memory in a portable storage device, the method comprising:
   a) the portable storage device allowing or disallowing host access to directory services for said non-volatile user memory in accordance with a permission indicia stored in a non-volatile register of the portable storage device;
   b) consuming the permission indicia in accordance with an extent of said host access;
   c) degrading access to said non-volatile user memory by reducing a speed of memory access as a level of remaining permission indicia decreases; and
   d) when the host device is in communication with a remote service center, replenishing or eliminating said permission indicia in accordance with a permission directive received from the remote service center via said host device.

11. The method of claim 10 further comprising regulating access by said host device in accordance with distinct host-device coupling quota data contained in said permission indicia; and
   wherein said consuming of said permission indicia includes consuming said distinct host-device coupling quota.

12. The method of claim 10 further comprising regulating access by said host device in accordance with inter-device transfer quota data contained in said permission indicia; and
   wherein said consuming of said permission indicia includes consuming said inter-device transfer quota.

13. The method of claim 10 further comprising regulating access by said host device in accordance with time quota data contained in said permission indicia; and
   wherein said consuming of said permission indicia includes consuming said time quota.

14. The method of claim 10 further comprising:
   e) disallowing host read access to said device-stored permission indicia without authorization from the remote service center.

15. A storage system comprising:
a) a portable storage device including:
   i) a non-volatile user memory for storing user data; and
   ii) a non-volatile register for storing permission indicia; and
b) a host device coupled to said portable storage device, wherein a combination of said host device and said portable storage device is operative to:
   i) in accordance with the permission indicia stored in the non-volatile register, regulate access to the non-volatile memory of the non-volatile storage device by allowing or disallowing host access to directory services for said non-volatile user memory;
   ii) consume the permission indicia in accordance with an extent of said host access;
   iii) degrade access to said non-volatile user memory by reducing a speed of memory access as a level of remaining permission indicia decreases; and
   iv) when said host device is in communication with a remote service center, replenish or deplete said permission indicia in accordance with a permission directive received from the remote service center via said host device.

* * * * *